United States Patent [19]
Yang et al.

[11] Patent Number: 5,906,094
[45] Date of Patent: May 25, 1999

[54] PARTIAL OXIDATION POWER PLANTS AND METHODS THEREOF

[75] Inventors: Wen-Ching Yang, Export; Richard A. Newby, Pittsburgh, both of Pa.; Ronald L. Bannister, Winter Springs, Fla.

[73] Assignee: Siemens Westinghouse Power Corporation, Orlando, Fla.

[21] Appl. No.: 08/846,396

[22] Filed: Apr. 30, 1997

[51] Int. Cl.$^6$ .................................. F02C 3/14; F02C 3/30
[52] U.S. Cl. ........................ 60/39.04; 60/39.05; 60/39.17
[58] Field of Search ................. 60/39.04, 39.05, 60/39.12, 39.161, 39.17, 39.182, 39.55

[56] References Cited

U.S. PATENT DOCUMENTS

| | | | |
|---|---|---|---|
| 2,511,385 | 6/1950 | Udale . | |
| 3,704,586 | 12/1972 | Bruns | 60/39.12 |
| 3,765,167 | 10/1973 | Rudolph et al. | 60/39.12 |
| 4,261,166 | 4/1981 | Mayrhofer | 60/39.12 |

FOREIGN PATENT DOCUMENTS

| | | |
|---|---|---|
| 595 026 A1 | 4/1994 | European Pat. Off. . |
| 950613 | 10/1956 | Germany . |
| 3413241 | 6/1985 | Germany . |
| 8700630 | 10/1988 | Netherlands . |
| 2 229 733 | 3/1990 | United Kingdom . |
| 2 236 145 | 3/1991 | United Kingdom . |
| 2 288 640 | 10/1995 | United Kingdom . |
| 91/05946 | 5/1991 | WIPO . |

*Primary Examiner*—Louis J. Casaregola

[57] ABSTRACT

A system and method for generating power having a partial oxidation turbine system and a primary turbine system. The partial oxidation turbine system receives a first air stream and a fuel stream and then partially oxidizes said fuel stream to produce a partially oxidized fuel stream. The primary turbine system receives the partially oxidized fuel stream and a second air stream and then combusts said partially oxidized fuel stream to produce rotating shaft power and an emission stream.

11 Claims, 2 Drawing Sheets

PARTIAL OXIDATION POWER PLANTS AND METHODS THEREOF

BACKGROUND OF THE INVENTION

This invention relates to staged combustion of fuel and partial oxidation of fuel.

Numerous approaches for improving the thermal performance of combustion turbine power generation systems have been proposed since the early 1950s when combustion turbines were first applied for stationary power generation. Alternative approaches range from advanced topping and bottoming cycles, to advanced turbine firing conditions. Some of these approaches have been put into practice to reach the current level of performance that combustion turbine power generation has evolved to today. The prevalent factor enhancing performance has been increases in firing conditions (temperatures and pressures) through advances in airfoil design, materials and cooling methods. Cycle variations are also being developed to improve system performance in contrast to hardware improvements, such as evaporative cooling cycles, recuperative cycles, intercooled cycles, humid air cycles, reheat cycles, advanced bottoming cycles, and elevated steam bottoming conditions.

Many proposed approaches for advanced combustion turbine power cycles have been rejected as being unworkable or uneconomical, and some have not yet been developed sufficiently to be verified, demonstrated and commercialized. Therefore, a need exists for new, viable approaches for improved power generation.

SUMMARY OF THE INVENTION

The claimed invention provides a system and method for generating power having a partial oxidation turbine system and a primary turbine system. The partial oxidation turbine system receives a first air stream and a fuel stream and then partially oxidizes said fuel stream to produce a partially oxidized fuel stream. The primary turbine system receives the partially oxidized fuel stream and a second air stream and then combusts said partially oxidized fuel stream to produce rotating shaft power and an emission stream.

DETAILED DESCRIPTION OF THE PREFERRED EMBODIMENTS

Figure 1:
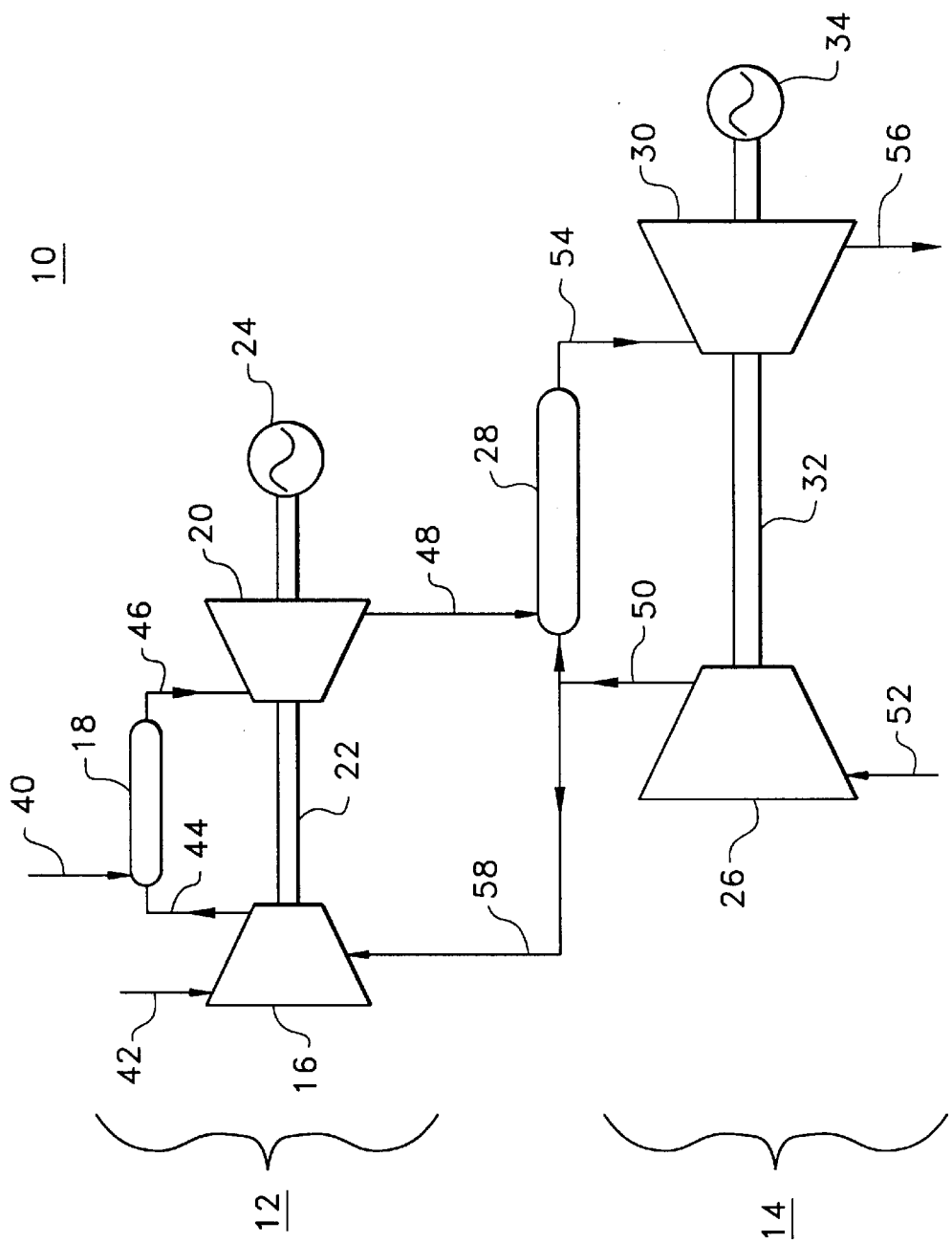
FIG. 1 shows a partial oxidation power plant flow chart having a partial oxidation turbine system and a primary turbine system.

Now referring to the figures, wherein like reference numerals refer to like elements, and in particular to FIG. 1, a partial oxidation power plant 10 has a partial oxidation turbine system 12 and a primary turbine system 14. (It shall be understood that "PO" represents "partial oxidation.") The PO turbine system 12 has a P0 air compressor 16, a PO combustor 18 and a PO turbine 20. A shaft 22 extends from the PO turbine 20 to provide rotating shaft power to the PO air compressor 16 and a generator 24 when in operation. Other embodiments of the invention may not have the generator 24. The primary turbine system 14 has an air compressor 26, a combustor 28 and a turbine 30. A shaft 32 extends from the turbine 30 to provide rotating shaft power to the air compressor 26 and a generator 34.

The PO power plant 10 integrates the PO turbine system 12 and the primary turbine system 14 to combust a fuel stream 40 in two stages. In the first stage, an air stream 42 is compressed in the PO air compressor 16 to produce a compressed air stream 44. The compressed air stream 44 is directed into the PO combustor 18 along with the fuel stream 40, where the fuel stream is partially oxidized to produce a partially oxidized fuel stream 46. The partially oxidized fuel stream 46 is expanded in the PO turbine 20 to produce an expanded, partially oxidized fuel stream 48 and to rotate the shaft 22, thereby providing rotating shaft power to the air compressor 16 and, in the case of excess power, to the PO generator 24 as well.

In the second combustion stage, the expanded, partially oxidized fuel stream 48 is combusted in the primary turbine system 14. The expanded, partially oxidized fuel stream 48 is directed into the combustor 28 along with a compressed air stream 50. The compressed air stream 50 is produced from an air stream 52 being compressed in the air compressor 26. The expanded, partially oxidized fuel stream 48 is further combusted in the combustor 28 to produce a combustor emission stream 54. The turbine 30 expands the combustor emission stream 54 to produce a power plant emission 56 and to rotate the shaft 32, thereby providing rotating shaft power to the generator 34 and the air compressor 26.

The combustion of the fuel stream 40 in two stages produces higher net cycle efficiencies. A first ASPEN PLUS simulation was run, with natural gas as the fuel stream 40, comparing the efficiency of a power plant consisting of only of the one stage, primary turbine system 14 to the two stage PO power plant 10 at different pressures. The results of the first simulation, as is shown in TABLE 1: COMPARISON OF EFFICIENCIES OF TWO STAGE FUEL COMBUSTION POWER PLANTS, show significant increases in efficiency between the one and two stage power plants and increases in efficiency with increases in operating pressure.

TABLE 1

COMPARISON OF EFFICIENCIES OF TWO STAGE FUEL COMBUSTION POWER PLANTS

|  | ONE STAGE | TWO STAGES | | |
| --- | --- | --- | --- | --- |
| OPERATING PRESSURE, BAR | 15 | 30 | 45 | 60 |
| NET CYCLE POWER, MW | 169.61 | 189.16 | 195.16 | 207.05 |
| TOTAL FUEL CONSUMPTION, BTU/HR | 1.6114E + 9 | 1.7258E + 9 | 1.7258E + 9 | 1.8294E + 9 |
| NET CYCLE EFFICIENCY, LHV | 35.91% | 37.40% | 38.58% | 38.62% |

The first simulation was performed under certain conditions. The primary turbine system 14 was modeled after the 501F Class turbine system sold by Westinghouse Electric Corporation, 11 Stanwix St., Pittsburgh, Pa. 15222. The PO turbine 20 was modeled after a rubber turbine designed to operate under the different conditions of the simulation. To make the results comparable, the natural gas flow rate was adjusted to maintain approximately similar mass flow rates through the 501F turbine 30. Further, the PO combustor 18 produced the partially oxidized fuel stream 46 at 2400° F.

A compressed air bleed 58 was used to direct a portion of the compressed air stream 50 to the air compressor 16 of the PO turbine system 12 for the 30 and 45 bar operating pressures in this first simulation. The compressed air bleed 58 enables the PO turbine 20 to generate only enough power to drive the PO air compressor 16, resulting in no power generated by the PO generator 24. At 60 bar, the PO turbine system 12 generates excess power, resulting in the PO generator producing 4.8 MW, compared to a net cycle power of 207 MW. Other embodiments of the invention may have the compressed air bleed 58 and the PO generator 24 used at different operating conditions. In the simulation, the PO compressor 16 was intercooled with two compression stages for the 30 and 45 bar operating pressures and with three intercooled compression stages for 60 bar operating pressure. Other embodiments of the invention may use more or less compression stages. The simulation did not recover the energy from intercooling, or from the power plant emission 56.

Two stage fuel combustion, as performed in the embodiment of the invention shown in FIG. 1, has a beneficial affect on compressed air usage and pollutant emissions. A single stage combustion power plant has emissions of approximately 12.7% oxygen, with most of the oxygen emissions being contributed by compressed air used to cool the turbine. The two stage power plant 10 of the invention has oxygen emissions of below 12% due to lower cooling requirements of the primary turbine system turbine 30. As a result, this embodiment of the invention operates with reduced costs in terms of compressed air usage. Also, the two stage power plant 10 has reduced $NO_x$ emissions compared to a one stage power plant.

Figure 2:
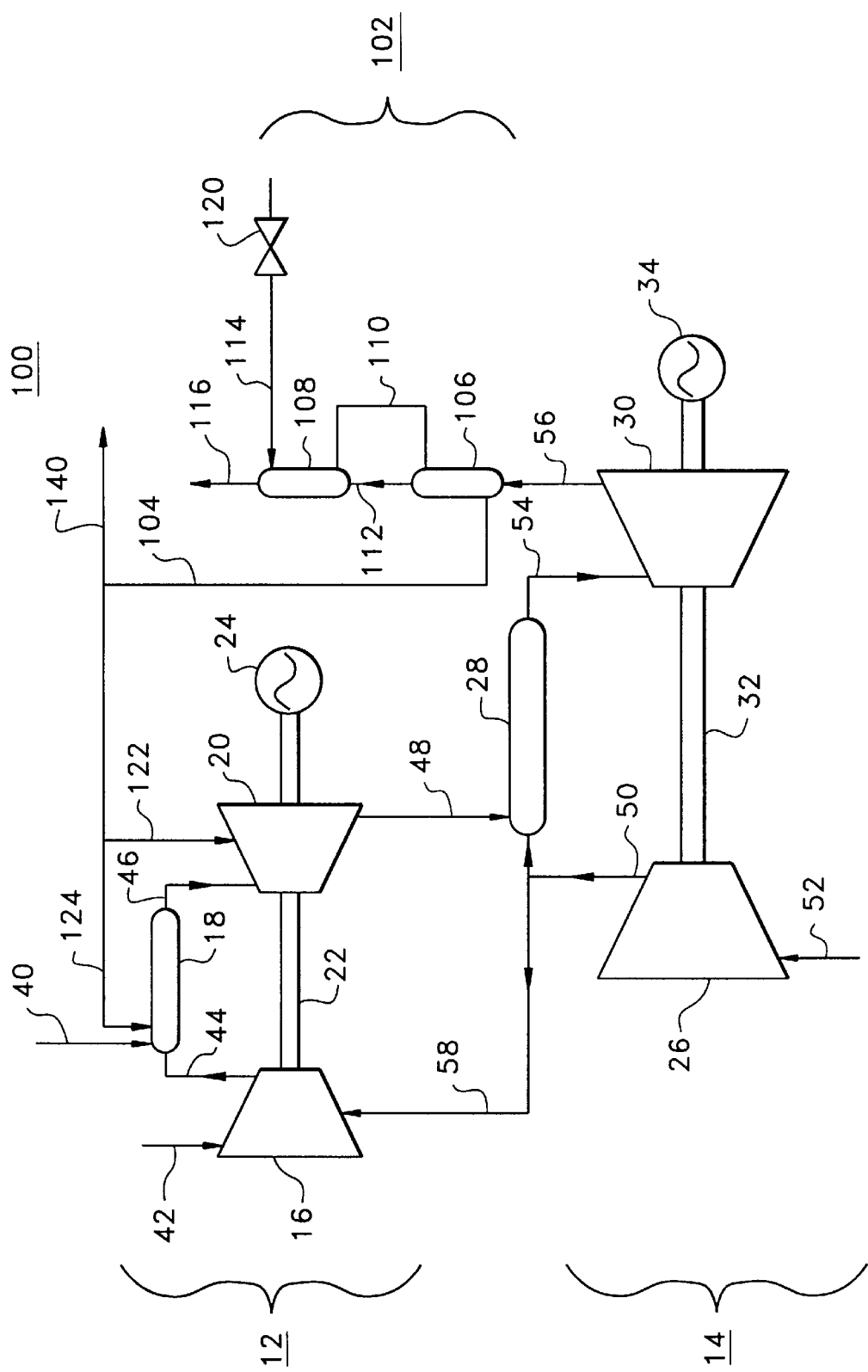
FIG. 2 shows a partial oxidation power plant flow chart having the two turbine systems of FIG. 1 and a steam generation system.

Now referring to FIG. 2, a partial oxidation power plant 100 comprises the PO turbine system 12 and the primary turbine 14 along with a steam generation system 102 for generating a steam flow 104 from the thermal energy of the power plant emission 56. The steam flow 104 is used in the PO combustor 18 and the PO turbine 20.

The steam generation system 102 comprises an evaporator 106 and an economizer 108. The power plant emission 56 is directed into the evaporator 106 where it heats a heated water stream 110 to produce the steam flow 104. The now cooled power plant emission 112 is then directed from the evaporator 106 into the economizer 108 where it heats a water stream 114 to produce the heated water stream 110. The now much cooler power plant emission exits the economizer 108 as the system exhaust 116. In a preferred embodiment of the invention, the flow rate of the water stream 114 may be adjusted with valve 120 in the line to generate a temperature difference of approximately 18° F. between the cooled power plant emission 112 and the heated water stream 110. Other embodiments of the invention may use other means to generate steam from the thermal energy of the power plant emission stream 56.

In the embodiment of the invention of FIG. 2, the steam flow 104 is split into a first portion 122 and a second portion 124. The first steam flow portion 122 is directed to the PO turbine 20 to help in cooling it. The second steam flow portion 124 is directed to the PO combustor 18 to lower the flame temperature in the combustor and, as a result, the generation of $NO_x$. The second steam flow portion 124 also inhibits soot particle formation. Other embodiments of the invention may have other uses for the steam flow 104, including directing an excess steam flow 140 from the steam flow 104 to a bottoming cycle or a steam cogenerator (not shown).

The combustion of the fuel stream 40 in two stages and generating steam from the thermal energy of the power plant emission 56 produces even higher net cycle efficiencies. A second ASPEN PLUS simulation was run, with natural gas as the fuel stream 40, comparing the efficiency of a power plant consisting of only of the one stage primary turbine system 14 to the two stage PO power plant 100 at different pressures. The results of the simulation are shown in TABLE 2: COMPARISON OF EFFICIENCIES OF TWO STAGE FUEL COMBUSTION POWER PLANTS WITH STEAM GENERATION, with net cycle efficiencies of approximately 50%.

TABLE 2

COMPARISON OF EFFICIENCIES OF
TWO STAGE FUEL COMBUSTION POWER PLANTS WITH
STEAM GENERATION

|  | ONE STAGE | TWO STAGES | | |
|---|---|---|---|---|
| OPERATING PRESSURE, BAR | 15 | 45 | 60 | 100 |
| NET CYCLE POWER, MW | 169.61 | 315.63 | 334.72 | 350.07 |
| TOTAL FUEL CONSUMPTION, BTU/HR | 1.6114E + 9 | 2.2264E + 9 | 2.3195E + 9 | 2.4161E + 9 |
| NET CYCLE EFFICIENCY, LHV | 35.91% | 48.44% | 49.33% | 49.58% |

This second simulation was performed under similar conditions as the first simulation. In a preferred embodiment of the invention, the partial oxidation power plant 100 operates at below 60 bar as the increase in efficiency from 60 to 100 bar is minimal. Other embodiments of both power plants 10 and 100 may include additional optimizations to improve cycle efficiency.

In the second simulation, the PO compressor 16 was intercooled with three intercooled compression stages and the PO turbine 20 had two stages. Other embodiments of the invention may use more or less stages in both the compressor and the turbine. Also, the energy from the intercooling is not recovered.

Two stage fuel combustion, as performed in the embodiment of the invention shown in FIG. 2, also has a beneficial affect on compressed air usage and pollutant emissions. A single stage combustion power plant has emissions of approximately 12.7% oxygen, with most of the oxygen emissions being contributed by compressed air used to cool the turbine. The two stage power plant 100 of the invention has oxygen emissions of below 7% due to steam cooling of the PO turbine 20, lower compressed air cooling requirements of the primary turbine system turbine 30, and injecting steam into the PO combustor 18. As a result, this embodiment of the invention operates with reduced costs in terms of compressed air usage. Also, the two stage power plant has reduced $NO_x$ emissions compared to a one stage power plant because of the lower combustion temperature in the PO combustor 18 due to steam injection and the two stage combustion process.

An equivalent to having two separate turbine systems on two shafts is to have the systems on one shaft, with appropriate power and speed transmission means therebetween. Another equivalent is to have only one air compressor supply compressed air to both combustors.

The invention may be practiced with fuel other than natural gas and operated at pressures other than those of the simulations. Additionally, the invention may be practiced with more than one partial oxidization turbine system, either arranged in series, parallel, or a combination thereof, producing partially oxidizing fuel streams for the primary turbine system. Also, the turbines may be placed on a single shaft or the shafts may be connected. Further, the invention may be practiced with any suitable partial oxidation turbine system and any suitable primary turbine system. Consequently, the present invention may be embodied in other specific forms without departing from the spirit or essential attributes thereof and, accordingly, reference should be made to the appended claims, rather than to the foregoing specification, as indicating the scope of the invention.

We claim:

1. A power generation system comprising:
   a) a partial oxidation means for receiving a first air stream and a fuel stream and partially oxidizing said fuel stream to produce a partially oxidized fuel stream therefrom;
   b) a partial oxidation turbine for receiving said partially oxidized fuel stream and expanding it into an expanded partially oxidized fuel stream,
   c) a primary combustion means for receiving said expanded, partially oxidized fuel stream and a second air stream, combusting said expanded, partially oxidized fuel stream, and producing an emission stream;
   d) a primary turbine for receiving said emission stream and producing rotating shaft power;
   e) steam generation means for heating a water stream with thermal energy from said emission stream to produce a steam flow; and
   f) means for delivering a first portion of said steam flow to said partial oxidation means and cooling said partial oxidation turbine with said steam flow first portion.

2. The power generation system of claim 1, further comprising a compressed air delivery means for delivering a compressed air stream from a primary air compressor in said primary combustion means to a partial oxidation air compressor in said partial oxidation means.

3. The power generation system of claim 1, further comprising second team flow delivery means for delivering a second portion of said steam flow to said partial oxidation means and injecting said steam flow second portion into a partial oxidation combustor disposed therein.

4. A power generation system comprising:
   a) a first turbine system comprising:
      i) a partial oxidation air compressor with an air inlet and a compressed air outlet;
      ii) a partial oxidation combustor with a compressed air inlet connected to said partial oxidation air compressor compressed air outlet, a fuel inlet, and a partially oxidized fuel outlet;
      iii) a partial oxidation turbine with a partially oxidized fuel inlet connected to said partially oxidized fuel outlet, and an expanded, partially oxidized fuel outlet; and
      iv) first shaft extending through said partial oxidation turbine for producing rotating shaft power;
   b) a second turbine system comprising:
      i) a primary air compressor with an air inlet and a compressed air outlet;
      ii) a primary combustor with a compressed air inlet connected to said primary air compressor compressed air outlet, a partially oxidized fuel inlet connected to said expanded, partially oxidized fuel outlet, and a primary combustor emission outlet;
      iii) a primary turbine with a primary combustor emission inlet connected to said primary combustor emission outlet, and a primary turbine outlet; and
      iv) second shaft extending through said primary turbine for producing rotating shaft power;
   c) a steam generator having a water inlet and a primary turbine emission inlet connected to said primary turbine outlet, a steam outlet, and a system exhaust outlet, and wherein said partial oxidation combustor has a steam inlet connected to said steam generator steam outlet.

5. The power generation system of claim 4, wherein said partial oxidation air compressor has a compressed air inlet connected to said primary air compressor compressed air outlet.

6. The power generation system of claim 4, wherein said primary air combustor has a primary turbine compressed air inlet connected to said primary air compressor compressed air outlet.

7. The power generation system of claim 4, wherein said partial oxidation turbine has a steam inlet connected to said steam generator steam outlet.

8. The power generation system of claim 7, wherein said partial oxidation combustor has a steam inlet connected to said steam generator steam outlet.

9. A method for generating power comprising the steps of:
   a) compressing a first air stream to produce a first compressed air stream;
   b) partially oxidizing a fuel stream in said first compressed air stream to produce a partially oxidized fuel stream;
   c) expanding said partially oxidized fuel stream in a first turbine to produce an expanded partially oxidized fuel stream, said first turbine having first shaft extending therethrough for producing rotating shaft power;
   d) compressing a second air stream to produce a second compressed air stream;
   e) combusting said partially oxidized fuel stream in at least a first portion of said second compressed air stream to produce combustion emission;
   f) expanding said combustion emission in a second turbine to produce a second turbine emission stream, said second turbine having second shaft extending therethrough for producing rotating shaft power;
   g) transferring thermal energy from said second turbine emission stream to a water stream to produce a steam flow; and
   h) cooling said first turbine with a first portion of said steam flow.

10. The method of claim 9, further comprising the step of directing a second portion of said second compressed air stream into said first compressed air stream.

11. The method of claim 9, wherein said partially oxidizing step further comprises the steps of partially oxidizing said fuel stream in a partial oxidization combustor and injecting a second portion of said steam flow therein.

* * * * *

UNITED STATES PATENT AND TRADEMARK OFFICE
CERTIFICATE OF CORRECTION

PATENT NO. : 5,906,094

DATED : May 5, 1999

INVENTOR(S) : Wen-Ching Yang et al.

It is certified that error appears in the above-identified patent and that said Letters Patent is hereby corrected as shown below:

Column 1, line 3, the following should be inserted as a new paragraph:

-- STATEMENT OF GOVERNMENT INTEREST

The U.S. Government has a paid-up license in this invention and the right in limited circumstances to require the patent owner to license others on reasonable terms as provided for by the terms of Contract No. DE-FG21-95MC32071 awarded by Department of Energy. --

Signed and Sealed this

Twenty-third Day of May, 2000

*Attest:*

Q. TODD DICKINSON

*Attesting Officer*     *Director of Patents and Trademarks*